3,377,292
SYNERGIZED LANTHANIDE CHELATE PHOTO-
LUMINESCENT COMPOSITION
Frederick Halverson, Stamford, Conn., assignor to American Cyanamid Company, Stamford, Conn., a corporation of Maine
No Drawing. Continuation-in-part of applications Ser. No. 299,193, Aug. 1, 1963, and Ser. No. 323,893, Nov. 15, 1963. This application Oct. 22, 1965, Ser. No. 502,503
21 Claims. (Cl. 252—301.3)

This invention relates to improved photoluminescent compositions. This application is a continuation-in-part of copending applications Ser. No. 299,193, filed Aug. 1, 1963, and Ser. No. 323,893, filed Nov. 15, 1963, the first application being now abandoned.

Photoluminescent compositions, which in the remainder of this specification and claims will be abbreviated as luminescent compositions, have achieved widespread use for decorative and other effects. The present invention relates to particular types of compositions in which chelates of rare earth elements of atomic number greater than 57 are incorporated in organic plastics, preferably in the presence of other types of material which enhance the luminescent efficiency of the compositions and which are referred to as "synergic" agents, which will be described in greater detail below. The term is used in a somewhat broader sense than the common usage for mixtures of materials both of which have a particular kind of activity but which exhibit an overall greater activity than the sum of the two. In the present case the synergic agents alone usually are not luminescent. The term metal chelate is used in the commonly accepted form of a species in which a ligand is attached to the metal atom by more than one atom in such a manner as to form a heterocyclic ring. Also, for brevity the rare earth elements referred to above will be generically referred to by their common general name of "lanthanide ions."

It should be noted that there are a number of types of chelates of lanthanide ions. Since the metal ion has a charge of +3 and many stable chelating ligands have a negative charge of −1, the most common lanthanide chelate has the chemical formula ML′$_3$, where M represents the tripositive metal ion and L′ represents the uninegative chelating ligand. This type is called a tris chelate, and may be formed with one or more solvent molecules of crystallization. It also is possible to prepare chelated species which have fewer than three chelating ligands, having the chemical formulas Ml′$_2$X and ML′XY, where X and Y are simple anions such as Cl−, OH−, SCN−, etc., or ML°X$_3$ and ML°$_2$X$_3$, where L° is an electrically neutral chelating ligand. Since the lanthanide ions are large, it is possible to form metal chelates in which more than three chelating ligands are coordinated to the same lanthanide ion. These may be electrically neutral chelate species represented by the chemical formula ML′$_3$L°, or they may involve charged species such as the tetrakis chelates represented by the chemical formula (ML′$_4$)−, which are associated with a cation such as the ammonium ion. Under some conditions it is possible to form chelates with ligands having a double negative charge, represented by the chemical formula ML″X, where L″ is a chelating ligand with a charge of −2. It is to be understood that all of these materials may be formed with one or more molecules of solvent of crystallization, and that the anions X or Y may be divalent as well as monovalent, with appropriate modifications of the empirical formulas. Furthermore the chelating ligands may have charged substituents at some distance from the site of the chelate ring formation which affects details of charge balancing but does not alter the type of chelate formation. Illustrations of various chelating ligands include α-polypyridyls for L°, betadiketonates for L′, and oxalate for L″.

Among others, the compositions of the present invention containing the chelates, preferably tris chelates, of the lanthanide ions have certain valuable characteristics. When illuminated by shortwave radiation, for example, ultraviolet light, the compositions luminesce in very narrow bands, for example having widths varying from about 30 to 100 A. All of the chelates will luminesce when irradiated with ultraviolet light but some of them will also luminesce when irradiated with shorter wave visible light, such as blue and violet light. According to the general theory of luminescence, the organic moiety of these lanthanide chelates, which is usually referred to as a ligand, on absorption of incoming photons of the shortwave radiation acquires a state of excitation known as the singlet state, then by a process of internal conversion and inter-system crossing arrives at a condition capable of exciting the lanthanide ion into a metastable electronic state. In this metastable electronic state the chelated lanthanide ion can emit a photon having an energy corresponding to a transition to a lower electronic level of the chelated ion. The energy difference between the electronic states involved in this optical transition is relatively insensitive to small thermal motions of the atoms surrounding the lanthanide ion, and so the emitted radiation is confined to a rather narrow band.

The wavelength of luminescence is determined by the particular lanthanide ion and not by the ligand. Typical wavelengths at which luminescence is observed from rare earth ions are as follows: Pr$^{+3}$ (0.65μ or 1.5μ), Nd$^{+3}$ (0.88μ or 1.06μ), Sm$^{+3}$ (0.60μ or 0.64μ), Eu$^{+3}$ (0.61μ), Tb$^{+3}$ (0.54μ), Dy$^{+3}$ (0.58μ), Yb$^{+3}$ (0.97μ or 1.0μ), Er$^{+3}$ (1.5μ), and Tm$^{+3}$ (1.8μ). It will be noted that some of these bands are in the visible, and some are in the near infrared.

The efficiency of energy transformation from the shortwave illumination to the longer wave luminescence is determined by the combination of ligand and lanthanide ion, and by the environment. For the use in liquid lasers, which constitutes the claimed subject matter of the parent application, Ser. No. 323,893, referred to above, two general classes of ligands are preferred, namely, beta diketones and 2-hydroxy aromatic ketones. The first class produces tris chelates of the following general formula:

I.

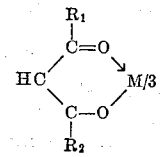

wherein R$_1$ and R$_2$ are the same or different radicals selected from the group consisting of alkyl of 1–18 carbon atoms, halogenated alkyl of 1–18 carbon atoms (F or Cl), alkoxy of 2–18 carbon atoms, furyl and alkyl substituted furyl and M is a lanthanide metal. When R$_1$ and R$_2$ are both alkyls, each contain about 4–18 carbon atoms. The symbol "/3" is intended to mean that additional chelating groups are present to form a tris chelate. When a lanthanide metal chelate of such a beta diketone is used in combination with a synergic agent as defined hereinbelow, the R$_1$ and R$_2$ groups of Formula I can be the same or different radicals selected from alkyl of 1–18 carbon atoms, halogenated alkyl of 1–18 carbon atoms (F or Cl), alkoxy, furyl, thienyl and aryl and alkaryl groups, e.g., phenyl or alkyl substituted phenyl where alkyl is 1–18 carbon atoms. When a synergic agent is not used in combination with the chelate, then the chelate may also contain aryl groups provided each contains at least two alkyl groups of 1–18 carbon atoms.

The hydroxy aromatic ketone chelates have the following formula:

II.
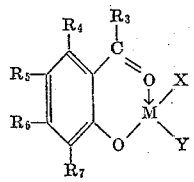

wherein X and Y may be the same or different radicals selected from a ligand of 2-hydroxy aromatic ketone as shown in formula II of a hydroxyl or an oxygen atom bridging two M groups; $R_3$ is an alkyl group of 1–18 carbon atoms or a fluorinated or chlorinated alkyl group of 1–18 carbon atoms; and $R_4$ through $R_7$ may be the same or different groups selected from hydrogen, an alkyl group containing 1–18 carbon atoms, or a fluorinated or chlorinated alkyl group of 1–18 carbon atoms and at least 2R groups of $R_4$ through $R_7$ are radicals other than hydrogen and M is a lanthanide metal.

The celates described above have certain advantages, notably suitable transparencies, good quantum efficiencies, and ready formation of liquid compositions. In the case of the solid plastic compositions of the present invention, when used for other purposes, these characteristics are not as important and translucent or even somewhat colored compositions are useful. This opens up a much wider choice of ligands, and indeed of types of chelates also, particularly as it is not as important to achieve the absolute maximum in quantum efficiency needed for laser use. Compositions according to Formula I above, in which $R_1$ and/or $R_2$ are fused aromatic rings, such as naphthyl and substituted naphthyl, or in which $R_1$ and $R_2$ both are methyl groups, are useful, as are compositions according to Formula II above, in which $R_3$ is alkoxy or aroxy, such as methoxy or phenoxy, or is hydrogen, and in which all of $R_4$ through $R_7$ may be hydrogen. Ligands of the type of hydroxynaphthaldehyde, which form compositions according to Formula II above in which $R_5$ and $R_6$ are joined together in such a way as to form aromatic ring systems, also are useful. Additional chelating agents, such as 8-hydroxy quinoline, tropolone, phenanthroline and $\alpha$-polypyridyls, and their derivatives, also are useful. As a matter of fact, with certain lanthnide compositions which luminesce in the near infrared region, for example involving $Yb^{+3}$, the quinolinate complex actually exhibits better luminescence than the corresponding beta diketone complex where $R_1=R_2=$phenyl, or $R_1=R_2=CF_3$, or $R_1=CH_3$, $R_2=CF_3$.

Specific examples of tris chelates of beta diketones are terbium tris dipivaloylmethide,
praseodymium tris trifluoroacetylacetonate,
samarium tris hexafluoroacetylacetonate,
dysprosium tris dipentafluoropropanoylmethide,
gadolinium tris dipivaloylmethide,
erbium tris diheptafluorobutyroylmethide,
neodymium tris perfluoropentanoyl-2,3-diethyl-5-furoylmethide,
terbium tris perfluorooctanoyl-2,3-ditrifluoromethyl-5-furoylmethide,
terbium tris tetrafluoroacetylacetonate,
europium tris pentafluoropropanoyl-2-furoyl methide,
lutecium tris hexafluoroacetylacetonate,
lutecium tris dipivaloylmethide,
terbium tris pentafluoropropanoyl-2,3-difluoro-5-furoylmethide,
samarium tris di (chlorodifluoroethanoyl) methide,
gadolinium chelate of ethyl stearoylacetate,
terbium chelate of butyl butyroylacetate,
praseodymium chelate of ethyl-4,4-dimethyl-3-oxovalerate, etc. The same rare earth metals ions as mentioned above may be present in the chelate of the 2-hydroxy aromatic ketone. Specific examples are the europium chelate of 3,4,5,6-tetramethyl-2-hydroxy acetophenone,
terbium chelate of 4,5-dimethyl-2-hydroxy acetophenone,
terbium chelate of 1-(2-hydroxy-4,5-ditrifluoromethyl phenyl)-butanone-1,
samarium chelate of 1-(2-hydroxy-3,4,5,triethylphenyl)-2,2,2-trifluoroethanone-1,
praseodymium chelateof 1-(2-hydroxy-4,5-dibutyl phenyl)-2,2,3,3,3-pentafluoropropanone-1,
europium chelate of 1-(2-hydroxy-4,5-dimethylphenyl)-2,2,2-trifluoroethanone-1,
erbium chelate of 1-(2-hydroxy-4,5-dipropylphenyl)-pentanone-1,
europium chelate of 1-(2-hydroxy-4,5,6-trimethylphenyl)-propanone-1,
terbium chelate of 1-(2-hydroxy-4,5-dimethylphenyl)-2,2-difluoro-2-chloroethanone-1,
praseodymium chelate of 1-(2-hydroxy-4,5-diisobutyl butyl phenyl)-propanone-1, etc.

With respect to the compounds falling within the Formula I given hereinabove, they can be prepared by forming an aqueous solution of a water soluble salt of the rare earth metal. The water soluble rare earth metal salts can be the nitrates, sulfates, acetates, chlorides, bromides, etc. After the aqueous solution of the rare earth metal salt has been formed, the pH is adjusted to a range of about 3 to 8.5 by means of a buffer material. The buffers which can be used for this purpose include mixtures of ammonium or alkali metal acetate, -phosphate, -citrate, etc., with its corresponding conjugate acid. In the next step, the ligand of acetylacetone or a substituted acetylacetone is incorporated into a non-aqueous solvent or liquid such as a lower molecular alkanol containing about 1 to 5 carbon atoms, a lower molecular alkane having about 1 to 6 carbon atoms, a lower molecular chlorinated aliphatic hydrocarbon having about 1 to 5 carbon atoms, a cycloaliphatic, lower molecular aliphatic ethers having not more than about 6 carbon atoms, aromatic hydrocarbons, such as, for example, benzene, toluene, xylene, etc. Other specific examples of the non-aqueous solvent or liquid material include ethanol, diethyl ether, hexane, cyclohexane and chloroform. The non-aqueous liquid containing the ligand is then neutralized with a base or alkaline material, such as, for example, ammonium hydroxide, alkaline metal hydroxide, alkali metal carbonates and bicarbonates, substituted ammonia, such as, aliphatic amines, etc. Neutralization of the ligand by means of the base or alkaline material produces a soluble salt of acetylacetonate. The water soluble rare earth metal salt and the acetylacetonate are combined and the resultant mixture, if desired, is heated to a temperature of about 30 to 100° C. In some instances, the reaction between the water soluble rare earth metal salt and the acetylacetonate may be preferably conducted at a temperature below room temperature, namely, from about 0° C. to about room temperature or about 25° C. The time of reaction between rare earth metal salt and the acetylacetonate may be from about 1 minute to 1 hour. If two phases are present at the end of the reaction, the desired product is in the non-aqueous phase, which is readily separated from the aqueous phase. The desired rare earth metal chelate of acetylacetonate can be purified by crystallization or other means readily known to those skilled in the art. For this purpose, the crystalline product material is dissolved in a suitable solvent, such as one of the non-aqueous solvent materials mentioned above, and then crystallized to form a product of enhanced purity. In some cases, the desired product upon being produced sublimes as an overhead vaporous material which can be condensed and cooled while the reaction is proceeding. As an alternative procedure, a rare earth metal oxide may be dissolved in nitric acid, hydrochloric acid, hydrobromic acid, acetic acid, etc., and the pH of the resultant solution adjusted to about 3 to 8.5 by means of the base or alkaline material previously described. The non-aqueous solvent or liquid material is then added to the salt solution of the rare earth metal and then a buffer of the type previously described is added thereto to bring the pH to within the desired neutral range. The acetylacetone or substituted acetylacetone, as such or in combination with a synergic agent is then added to the buffered solution. The remainder of the procedure can be the same as that described above.

With respect to the compounds falling within the Formula II above, a rare earth metal salt in the form of an acetate, chloride, bromide, nitrate, sulfate, etc., along with the ligand, which is a ketone of the type characterized as alkyl- or aryl-(o-hydroxyphenyl)-ketones are incorporated into a non-aqueous solvent or liquid material of the same type as described hereinabove in connection with the preparation of compounds falling within the Formula I. The resultant liquid mixture or solution is cooled to a temperature of about −20° C. to 0° C. Thereafter, anhydrous ammonia gas is passed through the liquid mass for a period of about 1 minute to 1 hour, while the temperature of the same is maintained at about −20° C. to 0° C. The desired product precipitates from the liquid mass and then it can be purified by recrystallization in a polar solvent, such as, for example, a lower molecular weight alkanol containing about 1 to 5 carbon atoms, a lower molecular aliphatic ether containing not more than about 6 carbon atoms, a lower molecular cyclic ether containing not more than about 6 carbon atoms, etc.

As an alternative procedure to the one given above in connection with the preparation of compounds falling within the definition of structural Formula II, an alkali metal bicarbonate or carbonate is employed in place of ammonia gas and the temperature of the reaction mass is maintained at about 30° C. to the boiling point of the solvent or liquid material. The desired product sublimes during the reaction and is collected in a suitable condenser as the reaction proceeds. The carbonate or bicarbonate of the alkali metal may be sodium carbonate, sodium bicarbonate, potassium carbonate, potassium bicarbonate, etc.

The quantum efficiency for luminescence, that is, the ratio of the number of photons emitted in luminescence to the number of photons absorbed in excitation, varies considerably for the lanthanide chelates, being particularly dependent on environment. Even the best of the chelating ligands give rise to only moderate quantum efficiencies, which is believed to be due to a number of the excited molecules losing energy by different paths which do not result in radiation. If a barrier could be developed to prevent excited molecules from losing energy via these paths, increased quantum efficiencies would result. Hydrocarbon radicals have been found to provide a barrier, but hydrocarbon solvents are not fully effective, presumably because the dispersion of individual molecules is not perfect.

Quite unexpectedly it has been discovered that the combination of the chelate with a synergic agent effects significant improvements. The synergic agents include a variety of classes of compounds, namely, the trialkyl and triaryl Group V–A oxides, where the Group V element is nitrogen, phosphorus, arsenic, antimony and bismuth, alkyl dialkyl phosphinates, dialkyl alkyl phosphonates, trialkyl phosphates, hexaalkyl phosphoramides, N,N-dialkylamides, dialkyl sulfoxides, cyclic sulfoxides, cyclic sulfones, dialkyl sulfones, aliphatic esters, aliphatic ketones, cycloalkanones, aliphatic aldehydes, etc., and their thio analogs. The trialkyl phosphine oxides may contain alkyl groups of about 1–18 carbon atoms, more usually about 5–12 carbon atoms, and the alkyl groups may also contain halogen in the form of fluorine or chlorine. The alkyl dialkyl phosphinates may contain alkyl groups of about 1–18 carbon atoms, more usually about 4–12 carbon atoms, and the alkyl groups may also contain fluorine or chlorine as substituents. The dialkyl alkyl phosphonates may contain alkyl groups of about 1–18 carbon atoms, more usually about 4–12 carbon atoms, and the alkyl groups may also contain fluorine or chlorine as substituents. The trialkyl phosphates may contain alkyl groups of about 1–18 carbon atoms, more usually about 3–12 carbon atoms, and the alkyl groups may also contain fluorine or chlorine as substituents. The alkyl sulfoxides and alkyl sulfones may contain alkyl groups of about 1–18 carbon atoms, more usually about 2–12 carbon atoms, and the alkyl groups may also contain halogen in the form of fluorine or chlorine. The cyclic sulfoxides and sulfones may be considered as derived from cycloalkanes by replacement of a methylene group by a sulfoxide or a sulfone grouping, and the ring size may vary from 3 to about 10 atoms. The aliphatic portion of the molecule may be halogenated (fluorinated or chlorinated). The aliphatic esters are esters of aliphatic carboxylic acids, in which the aliphatic radicals are present as alkyl groups of about 1–18 carbon atoms, more usually about 2–8 carbon atoms, and the alkyl groups may also contain halogen in the form of fluorine or chlorine. The aliphatic ketones and cycloalkanones which are useful as synergic agents are those containing at least 4 carbon atoms. The ketones may contain alkyl substituents ranging from 1–18 carbon atoms and the alkyl substituents may also contain fluorine or chlorine substituents. The aliphatic aldehydes useful as synergic agents may have alkyl substituents of about 2–18 carbon atoms, more usually about 4–10 carbon atoms, and the alkyl substituents may also contain halogen in the form of fluorine or chlorine. Specific examples of the synergic agents are tri(2-ethylhexyl) phosphine oxide, tri(2-chlorobutyl) phosphine oxide, tri-n-octyl phosphine oxide, tri-n-octyl phosphine sulfide, tri amyl phosphine oxide, tri isobutyl phosphine oxide, butylethylmethylphosphine oxide, ethyl dibutyl phosphinate, hexyl dibutyl phosphinate, isopropyl diamyl phosphinate, butyl dibutyl phosphinate, dibutyl butyl phosphonate, diethyl trifluoromethyl phosphonate, dibutyl (2-chloroethyl) phosphonate, dibutyl cyclohexyl phosphonate, tributyl phosphate, tributyl thiophosphate, tri octyl phosphate, tri isobutyl phosphate, tri(2-ethylhexyl) phosphate, hexaethyl phosphoramide, hexamethyl phosphoramide, N,N-dibutylformamide, dimethylsulfoxide, ethyl propyl sulfoxide, diamylsulfoxide, dihexyl sulfoxide, dibutyl sulfone, di(2-ethylhexyl) sulfone, thiolane sulfoxide, tetrahydropyran sulfoxide, tetrahydropyran sulfone, butylacetate, isopentylacetate, methylbutyrate, methyloctanoate, octylacetate, methylstearate, heptanone-2-nonafluorobutylacetone, 5-methyl-2-hexanone, cyclohexanone, heptaldehyde, 3 - methyl - butyraldehyde, 4 - trifluoromethylpentanal, triethyl amine oxide, tributylarsine oxide, trihexylstibine oxide, tripropylbismuthine oxide, trimethyl stibine oxide, triphenyl phosphine oxide, etc.

The chelate and synergic agent combination can be produced in several ways. In a direct procedure the synergic agent, such as trialkyl phosphine oxide, alkyl dialkyl phosphinate, dialkyl alkyl phosphonate, trialkyl phosphate, alkyl sulfoxide, alkyl sulfone, hexaalkyl phosphoramide, cyclic sulfoxide, cyclic sulfone, or a mixture thereof, is dissolved in an appropriate solvent, and this solution is combined with a solution or slurry of the rare earth metal chelate, and the resulting mixture is allowed to stand up to two weeks at ambient temperature with agitation. The reaction may be accelerated by mild heating. Alternatively, the combination of synergic agent and rare earth metal chelate may be obtained by combining an aqueous solution of the rare earth nitrate at an appropriate pH of about 1 to 7, with a hydrocarbon solution of the chelating ligand and the synergic agent, and shaking the mixture vigorously for 20 minutes to 1 hour. The aqueous phase is removed, and the hydrocarbon phase contains the rare earth metal chelate-synergic agent complex. The aliphatic esters, aliphatic ketones and aliphatic aldehydes to be used as synergic agents may be combined simply with solutions of the metal chelate to produce the desired combination. In general, the molar ratio of ester, ketone, or aldehyde to metal ion in solution preferably does not substantially exceed about twenty.

The synergic agent is employed with the chelate in order to provide the shielding or insulating effect which is needed to minimize the radiationless loss of energy from the chelating ligand-lanthanide ion system. The amount of synergic agent to be used for this purpose may vary considerably, however, for my purpose about one to one hundred moles of the synergic agent per mole of the metal chelate may be used, more usually, about two to eight moles of the synergic agent per mole of metal chelate.

In order to provide a semiquantitative measure of the relative effectiveness of various lanthanide metal chelates as luminescent materials, with and without synergic agents and in different environments, a series of experiments was performed in which the lifetime of the luminescent electronic state and relative efficiencies for luminescence were evaluated. The lifetime, $\tau$, is defined as the time it takes the intensity of luminescence to decrease from its value immediately following a burst of exciting radiation to $1/e$ of that value. It is obtained by plotting the natural logarithm of the luminescence intensity as a function of time subsequent to a short burst of exciting radiation, measuring the mean slope of the curve thus obtained, and relating it to $\tau$ by the equation $$\tau = \left[ -\frac{d \ln I}{dt} \right]^{-1}$$

where $I$ is the intensity of luminescence and $t$ is the time. This measured lifetime $\tau$ is a function of the rate at which excited molecules decay by emission of radiation and the rate at which they lose energy by non-radiative processes. Only the radiative process, of course, contributes to the luminescence, and the non-radiative processes result in a shortening of the lifetime and a decrease in quantum efficiency for luminescence. Hence, for a given lanthanide complex, where the radiative process is largely fixed by the central ion and its directly coordinated groups, appreciable variations in measured lifetime can be associated with the effect of environment on the radiationless processes for decay of excited molecules.

Relative luminescence efficiencies were estimated by observing the intensity of light emission at the wavelength characteristic for the lanthanide ion under consideration, during the burst of exciting radiation. This technique is relatively accurate for systems involving the same ligand, but the result becomes somewhat more qualitative in comparing systems where the ligands differ widely.

Results obtained in this manner for a group of europium chelates are presented in Table I. The simple tris chelates are soluble in alcohol but not in hydrocarbons. Attempts to prepare methylcyclohexane solutions resulted in mixtures which appeared to be colloidal suspensions rather than true solutions. The synergic agent complexes, however, were very soluble in methylcyclohexane or in benzene at 25° C.

TABLE I

| Run No. | Temp., °C. | Synergic Agent | $R_1^e$ | $R_2^e$ | $\tau$, Microsec. | | Relative Luminescence Efficiency |
|---|---|---|---|---|---|---|---|
| | | | | | Alcohol* | Hydro** | |
| 1 | 25 | | $CH_3$ | $CH_3$ | 226 | 267 | 0.05 |
| 2 | 25 | | $C(CH_3)_3$ | $C(CH_3)_3$ | 335 | 326 | 1 |
| 3 | 25 | | $CH_3$ | Phenyl | 162 | 263 | 5 |
| 4 | −20 | | $CH_3$ | do | 396 | | 12 |
| 5 | −80 | | $CH_3$ | do | 427 | | 28 |
| 6 | −139 | | $CH_3$ | do | 455 | | 30 |
| 7 | 25 | | $CF_3$ | $CH_3$ | 435 | ∼610 | 13 |
| 8 | 25 | TOPO a | $CF_3$ | $CH_3$ | | 746 | f>26 |
| 9 | 25 | TBP b | $CF_3$ | $CH_3$ | | 745 | f>19 |
| 10 | 25 | | $CF_3$ | $CF_3$ | 430 | | 16 |
| 11 | −21 | | $CF_3$ | $CF_3$ | 439 | | 28 |
| 12 | 25 | TOPS k | $CF_3$ | $CF_3$ | | 760 | f>64 |
| 13 | 25 | TOPO c | $CF_3$ | $CF_3$ | | 791 | f>80 |
| 14 | −80 | TOPO c | $CF_3$ | $CF_3$ | | | f>80 |
| 15 | 25 | | $CF_3$ | $CF_3$ | g 417 | | |
| 16 | 25 | DMSO h | $CF_3$ | $CF_3$ | g 565 | | |
| 17 | 25 | | Phenyl | Phenyl | ∼60 | 142 | 7 |
| 18 | 25 | TOPO d | do | do | | 318 | f>14 |
| 19 | 25 | | $CF_3$ | Thienyl | 371 | | ∼19 |
| 20 | 25 | TOPO a | $CF_3$ | do | | 704 | f∼80 |
| 21 | 25 | | $C_2F_5$ | Furyl | 380 | | ∼30 |
| 22 | 25 | TOPO a | $C_2F_5$ | do | | 681 | f∼70 |

*3:1 volumetric ratio of ethanol to methanol.
**Methylcyclohexane.
a Present as trioctylphosphine oxide in twice the molar amount of chelate.
b Present as tributyl phosphate in twice the molar amount of chelate.
c Present as trioctylphosphine oxide in about three times the molar amount of chelate.
d Present as trioctylphosphine oxide in about fifteen times the molar amount of chelate.
e In the foregoing table, the column headings designated as $R_1$ and $R_2$ represent the substituents of the chelate shown in Formula I given hereinabove.
f Luminescence efficiencies in hydrocarbon solvent.
g Lifetime in tetrahydrofuran solution.
h Present as dimethyl sulfoxide in about forty times the molar amount of chelate.
k Present as trioctylphosphine sulfide in twice the molar amount of chelate.

The plastic compositions of the present invention containing the chelated lanthanide ions, and particularly the compositions with added synergic agents, are useful for a number of decorative purposes and are also useful for coded inks, as each composition has its own sharply defined radiation band which can be read off by ultraviolet illumination and suitably filtered radiation detectors. This field of utility, which is useful for example in coded bank checks to designate accounts and other uses, is one of many fields for which the compositions of the present invention are suitable. The coded inks as such are not claimed in the present invention but form the subject matter of the copending application of Freeman and Halverson, Ser. No. 437,866, filed Mar. 8, 1965, and assigned to the assignee of the present application.

Among the important advantages of the compositions of the present invention are included increased luminescence efficiency over some of the liquid compositions which are claimed in the laser claims of the parent application referred to above, the improved quantum efficiency being particularly marked in some cases involving terbium and samarium chelates. Also, the plastic matrix is soft and does not produce wear on mechanical devices. This is of importance because it is not at all necessary that the compositions of the present invention be used in the form of sheets or coating compositions. They can also be used in the form of finely divided particles which can be prepared by mechanical devices to produce dry dusts or suspensions. Mention has been made above of the fact that contrary to the claimed subject matter of the parent application, it is in no sense necessary that the synergic agents or even the plastic matrix itself be colorless. For some purposes colored matrices, that is to say, matrices which exhibit color under ordinary reflected visible light, are an advantage as unusual effects can be obtained. Thus, for example, certain displays in which the compositions are colored under visible light will change when subjected to ultraviolet irradition, which permits interesting advertising displays, stereoscopic illusions, and the like.

It is not necessary that the chelates or synergized chelates be first prepared and then incorporated into plastics, although this is an effective way of carrying out the present invention. It is also possible to disperse the chelated lanthanide ions in polymerizable monomers such as acrylonitrile, methyl methacrylate, styrene, and the like, and then polymerize to the final plastic matrix with the chelates in situ. Sometimes it is necessary to effect such polymerization by rather gentle means, such as radiation, although in other cases chemical polymerization catalysts can be used and do not adversely affect the chelates. In every case, if the plastic matrices are properly made they serve to protect the chelated lanthanide ions against attack by moisture and other reactive chemical constituents of the atmosphere or the environment in which the compositions are to be used. Moisture particularly appears to have a degrading effect on the efficiency of the chelated lanthanide ions and greatly shortens the useful life for such compositions. It is, therefore, an added advantage of the present invention that the plastic matrix protects active luminescent constituents and permits a long, effective, useful life.

Another advantage of the luminescent plastic compositions of the present invention is that they are more useful with mixtures of lanthanide ion complexes than would be expected from knowledge of their general properties. Thus the lanthanide ions, when mixed, often have adverse effects on luminescence. For example, the presence of a neodymium chelate coprecipitated with a crystalline chelate of europium causes a drastic decrease in the luminescence at the characteristic wavelength of europium. On the other hand, in plastic matrices one chelate appears to have little if any effect on the other. This is an advantage, particularly in the important field of coded inks, which is described in the Freeman and Halverson application above referred to. It is not known just how this relative lack of interference in mixtures results. It is thought probable that it is due, at least to some extent, to the matrix itself, which may keep chelate molecules of the different lanthanide ions sufficiently insulated from each other. It is, however, also possible that the presence of the synergic agent in the chelates may play a part. Since the exact mechanism of the protective effect of the plastic matrices in the present invention is as yet not known, it is not desired to limit the present invention to any particular mechanism of how this effect results. All that is known at the present time is that the effect can be observed.

Some of the synergic agents which are liquids at room temperature, such as dimethyl sulfoxide and tributyl phosphate, are capable of dissolving the lanthanide tris chelates, but in the pure state they do not enhance the luminescence as much as when diluted with a relatively non-polar substance. A relatively non-polar plastic matrix functions very well as this diluent. This effect may be due to the fact that where the synergic agents provide a strongly polar liquid medium some dissociation of the chelate complex may be promoted. However, the exact mechanism is not as yet fully known and it is not desired to limit the invention to any theory of action. The quantitative effect is illustrated in the following set of experiments where benzene is used as a diluent in order to maintain a liquid phase throughout the range. Polystyrene would exhibit a similar behavior for the particular europium chelate used.

A series of solutions of europium tris furylpentafluoropentadionate, abbreviated as $Eu(FPFP)_3$, was prepared in which the europium chelate concentration was maintained constant while the solvent consisted of mixtures of benzene and dimethylsulfoxide, abbreviated as DMSO. The quantum efficiencies for luminescence in the orange-red region of the spectrum were measured, and the results are given in Table II. All measurements were made at 25° C. Solution No. 1 was a saturated solution of the chelate in benzene and had a slightly lower concentration than the remainder. Solution No. 5 involved pure DMSO as the solvent.

TABLE II

| Solution Number | Mole Ratio $DMSO/Eu(FPFP)_3$ | Quantum Efficiency |
|---|---|---|
| 1 | 0 | 0.014 |
| 2 | 10 | 0.40 |
| 3 | 100 | 0.44 |
| 4 | 1,000 | 0.42 |
| 5 | 1,500 | 0.30 |

The invention will be described in greater detail in connection with the specific examples. The earlier examples described the formation of the lanthanide ion chelates and synergic agent complexes themselves, and subsequent examples illustrate the incorporation of these materials into various plastic matrices to produce the compositions of the present invention. In the specific examples the parts are by weight unless otherwise stated. Parts by volume are corresponding parts, e.g., milliliters and grams.

Example 1

Europium oxide, $Eu_2O_3$, is dissolved in dilute nitric acid (alternatively hydrochloric acid can be used) and the pH of the resultant aqueous solution is adjusted to 8.1 by using ammonium hydroxide. An equal volume of ethanol is added to the aqueous solution and then it is buffered with a 1 molar solution of sodium acetate to give a pH of 7.5. To the foregoing buffered liquid mass is added a solution of thenoyltrifluoroacetone in ethanol. The total mass is heated to 40° C. and maintained at that level for a period of 5 minutes. A precipitate is formed which is the desired compound of tris-(thenoyltrifluoroacetylacetonato)-europium (III). During the precipitation of the desired chelate the pH of the solution was maintained by the periodic addition of sodium acetate buffer. The desired product was purified by recrystallization from an ethanol solution. The theoretical empirical analysis of the desired compound is carbon 35.35%, hydrogen 1.48%, sulfur 11.8% and europium 18.63%. By actual analysis the compound was found to contain carbon 35.79%, hydrogen 1.57%, sulfur 11.5% and europium 18.60%.

Example 2

0.269 grams of dysprosium chloride are charged to 15 milliliters of water and the resultant solution is buffered with sodium acetate to provide a pH of 5.1. 0.462 gram of trifluoroacetylacetone are charged to 15 milliliters of an aqueous solution containing 60% of ethyl alcohol. 0.45 cc. of 7.3 molar ammonium hydroxide are added to the acetylacetone solution and then it is buffered by means of ammonium acetate to provide a pH of 5.0. The two solutions were combined. A precipitate formed which was isolated by means of filtration. The precipitated solids were recrystallized from a solution composed of 50% benzene and 50% chloroform. The desired product was tris-(trifluoroacetylacetonato)-dysprosium (III).

Example 3

0.692 grams of europium nitrate are charged to 10 milliliters of water. 1.20 grams of hexafluoroacetylacetone are charged to 15 milliliters of absolute diethyl ether, and 0.80 milliliter of 7.3 M ammonium hydroxide are added to the ether solution. The aqueous solution and the ether solution are shaken together for 20 minutes at 30° C. The ether phase was isolated and dried. The desired product was obtained from this ether solution by evaporating away the ether. The product was tris-(hexafluoroacetylacetonato)-europium (III).

Example 4

0.226 gram of terbium nitrate are charged to 10 milliliters of water. 0.384 gram of 1-furyl-4,4,5,5,5-pentafluoro-1,3-pentanedione are charged to 10 milliliters of diethyl ether, and 0.21 milliliter of 7.3 M ammonium hydroxide are added to the ether solution. The two solutions are shaken together for 30 minutes. The desired product, tris-(1-furyl-4,4,5,5,5-pentafluoro - 1,3 - pentanedionato)-terbium (III) was isolated from the ether phase as described in Example 2 above.

Example 5

0.299 gram of samarium sulfate and 0.510 gram of orthohydroxyacetophenone are charged to 85 milliliters of absolute ethanol. This solution is cooled to 0° C. and is stirred continually while pure ammonia gas is bubbled through the solution for 20 minutes or until no further color change in the solution occurs. 100 milliliters of cold (0° C.) pentane is then added and the addition of ammonia is stopped. The reaction mass is then allowed to warm to room temperature (25° C.) and the desired product, tris-(o-hydroxyacetophenono) - samarium (III) precipitates out and is collected by filtration. The product is purified by recrystallization from benzene.

Example 6

0.450 gram of europium nitrate is charged to 20 milliliters of an ethanolic solution containing 5% of water. This solution is buffered to a pH of 7.1 with an acetate buffer. 0.575 gram of dipivaloylmethane and 0.120 gram of sodium hydroxide are charged to 80 milliliters of absolute ethanol. This solution is added to the europium solution and the whole is stirred at 35° C. for 1 hour. The desired product tris - (dipivaloylmethanato) - europium (III) is obtained from this reaction mass by evaporating the liquid portion and distilling or subliming the product from the so-obtained residue.

Example 7

0.218 gram of praseodymium nitrate is charged to 20 milliliters of water, and the solution buffeted to a pH of 7.6 with an acetate buffer. 0.327 gram of 1,1,1,2,2-pentafluoroheptane(3,5)dione and 0.218 gram of di-normal hexylsulfoxide are charged to 30 milliliters of normal hexane and the two solutions are shaken together for 1 hour at 25° C. The desired product, tris-(pentafluoropentandionato) - bis(dihexylsulphoxide) - praseodymium (III), is isolated from the hexane phase by drying the hexane solution and removing the solvent by evaporation.

Example 8

The desired product, tris - (hydroxydimethyl benzophenono)-europium (III) is obtained from 0.330 gram of europium acetate and 0.700 gram of 2-hydroxy-4,5-dimethyl benzophenone by following exactly the procedure of Example 5.

Example 9

Two volumes of an aqueous solution of 0.25 molar europium nitrate at pH=6.2 were added to one volume of hexane solution of 0.10 molar trifluoromethylacetylacetone and 0.05 molar trioctylphosphine oxide. The mixture was shaken vigorously for about 30 minutes, the aqueous phase removed and the hexane solution allowed to evaporate. The europium trifluoromethylacetylacetonate-trioctylphosphine oxide complex separated out as a pale yellow oil exhibiting intense photoluminescence at 613 millimicrons. This oil was readily soluble in methylcyclohexane.

Example 10

The same procedure was followed as in the previous preparation of Example 9, except that the trioctylphosphine oxide was replaced by tributyl phosphate.

Example 11

The same procedure was followed as in the preparation of Example 9, except that the trifluoromethyl-acetylacetone was replaced by thenoyltrifluoroacetone, and the pH of the europium nitrate solution was adjusted to about 5.

Example 12

Sixty-one mg. of trioctylphosphine oxide were dissolved in 50 ml. of methylcyclohexane, and this solution was added to a slurry of 48 mg. of europium tris hexafluoroacetylacetonate in 50 ml. of methylcyclohexane. The resulting mixture was allowed to stand at ambient temperature for five days with intermittent shaking and a clear solution resulted. About half the methylcyclohexane solution was evaporated to reduce the volume of solution to 50 ml.

Example 13

Four milligrams of europium tris dibenzoylmethide were dissolved in 100 ml. methylcyclohexane. To this solution 22 mg. of trioctylphosphine oxide were added, and the resulting mixture allowed to stand for three hours with agitation. Then methylcyclohexane was evaporated until the volume was reduced to 50 ml.

Example 14

Six mg. of Eu (hexafluoroacetylacetonate)$_3$ were dissolved in 50 ml. of dry tetrahydrofuran, and 22 milligrams of dimethyl sulfoxide were added to the resulting solution. This mixture was allowed to stand for two hours with agitation.

Example 15

0.60 gram of hexafluoroacetylacetone was dissolved in 15 milliliters of absolute diethyl ether, and this was neutralized with 0.41 milliliters of 7.16 M NH$_4$OH, the fumes formed over the ether solution being allowed to dissolve therein. Then 0.77 gram of trioctylphosphine oxide was dissolved in the ether solution. An aqueous solution prepared by dissolving 0.45 gram of sumarium nitrate hexahydrate in 10 milliliters of water then was added dropwise with shaking. Shaking was continued for 18 hours at which time the aqueous phase was buffered at pH 7 and shaking continued for another hour. The ether phase, combined with an ether extract of the aqueous phase, was extracted once with water, dried and evaporated. The product, samarium (hexafluoroacetylacetonate)$_3$(trioctylphosphine oxide)$_2$, was a light yellow oil.

Example 16

A solution of 0.35 gram of pentafluoroheptanedione in 10 milliliters diethyl ether was treated with one equivalent of ammonium hydroxide (about 0.2 milliliter of 7.2 M NH$_4$OH) and the fumes so generated were allowed to dissolve in the ether. To this solution there was added slowly and with vigorous shaking a solution of 0.25 gram of terbium nitrate hexahydrate in 15 milliliters of pH 6.5 phosphate buffer, followed by additional shaking until the aqueous phase cleared. The ether phase then was combined with an ether extract of the aqueous phase, was washed once with cold water and dried over Na$_2$SO$_4$. Upon evaporation a cream-colored solid was precipitated and collected. This crude product was extracted with warm (40° C.) water for 30 minutes, filtered with a Buechner funnel and air dried, and then was recrystallized from benzene, yielding the terbium tris chelate of pentafluoroheptadione.

Example 17

0.431 gram of ytterbium nitrate tetrahydrate were dissolved in 170 milliliters water to which 5 milliliters of 2 N nitric acid had been added. Then a solution of 0.800 gram of 8-hydroxyquinoline dissolved in 40 ml. of 1 M acetic acid was added to the ytterbium nitrate solution. Six grams of urea were added, and the mixture was heated to 90° C. where it was held for 18 hours, stirring continuously. After cooling the precipitate was filtered off, washed several times with warm water, and then dried under vacuum, giving a yellow solid, Yb(8-hydroxyquinolinate)$_3$.

Example 18

A solution of 0.7 gram of 1,1,1,2,2-pentafluoro-3,5-heptanedione in 20 milliliters diethyl ether was neutralized with 0.41 milliliter of 7.16 M NH$_4$OH, the fumes formed over the ether solution being allowed to dissolve therein. To this solution there was added slowly and with vigorous shaking a solution of 0.25 gram of luropium nitrate hexahydrate in 15 milliliters of pH 6.9 phosphate buffer. Initial cloudiness in the aqueous phase cleared with continued shaking. The ether phase was combined with an ether extract of the aqueous phase, was washed with cold water and was dried over Na$_2$SO$_4$. Upon evaporation of the ether a cream-colored solid was precipitated. This material was recrystallized from petroleum ether, giving a white solid which analyzed as the ammonium salt of the tetrakis chelate, (NH$_4$)Eu(pentafluoroheptadionate)$_4$. The theoretical empirical analysis for europium as europium oxide is 16.80%, and by actual analysis the compound was found to contain 16.74%.

Example 19

A mixture of 0.35 gram of europium nitrate hexahydrate and 1.64 grams of 2-hydroxy-4,5-dimethylacetophenone in 50 milliliters absolute ethanol was refluxed for 10 minutes, whereupon 0.8 gram of solid sodium bicarbonate was added to the solution and reflux was maintained for 16 hours. The reaction mixture was filtered to remove solids, and the yellow filtrate was evaporated to dryness. This residue was extracted with petroleum ether, leaving a yellow solid which was recrystallized twice from carbon tetrachloride. The product obtained had the composition Eu(hydroxydimethyl acetophenono)$_2$(OH).

Example 20

The procedure of Example 15 is repeated replacing the samarium nitrate hexahydrate with a stoichiometrical equivalent of neodymium nitrate hexahydrate. The resultant synergic agent complex, neodymium (hexafluoroacetylacetonate)$_3$(trioctylphosphine oxide)$_2$ is an oil with a faint bluish color.

Example 21

0.31 gram of α-dipyridyl are added to a warm solution of 0.37 gram of praseodymium chloride heptahydrate in 5 grams of absolute ethanol. The solution is heated to 60° C. for ten minutes and then filtered. The precipitate is washed three times with small portions of cold ethanol, dried by suction, and then is placed in a vacuum desiccator for 2 days. The product has the composition Pr(dipyridyl)$_2$Cl$_3$.4H$_2$O.

Example 22

A plastic body was incorporated with a photo-luminescent material to demonstrate the effectiveness of the compounds of the present invention in that matrix. For that purpose, polymethyl methacrylate having a molecular weight of about 100,000 was dissolved in benzene to provide a solution containing 300 parts of methylmethacrylate and 500 parts of benzene. Another benzene solution was made of europium (thenoyltrifluoroacetonate)$_3$(trioctylphosphine oxide)$_2$ in which 5 parts of the latter were combined with 5000 parts of benzene, the product being prepared in accordance with Example 11. The two benzene solutions were combined to form a clear, homogeneous solution. Thereafter, the benzene was removed from solution by slow evaporation, leaving a clear, transparent solid mass of the methacrylate polymer containing evenly distributed therethrough the acetonate. A figure was inscribed on the surface of the polymer body containing the acetonate. Upon irradiation with ultraviolet light the figure glowed with a pleasing orange-red color. The pleasing feature of the color comes from the narrow band width of the photoluminescence.

Example 23

The procedure of Example 11 was repeated replacing the thenoyltrifluoroacetone with a stoichiometrical equivalent of 1 - furyl - 4,4,5,5,5-pentafluoro-1,3-heptanedione. The resulting synergic agent complex was dissolved in benzene in the ratio of 2 parts complex and 50 parts benzene. This solution was combined with a benzene solution consisting of 100 parts of polymethylmethacrylate and 560 parts of benzene. The benzene was evaporated from the resultant mixture by passing a stream of warm nitrogen gas over it, and the residue then was placed in a vacuum oven maintained at 60° C. for 24 hours. This residue was ground to a fine powder, heated to 200° C. for 20 minutes in a dry nitrogen atmosphere, and then extruded as a fiber of about 0.8 mm. in diameter. The fiber thus obtained was strongly luminescent, exhibiting the typical orange-red luminescence of the europium chelate complex. The emitted spectrum was the same as that observed for a methylcyclohexane solution of europium(furylpentafluoroheptadionate)$_3$ - (trioctylphosphine oxide)$_2$. The luminescent fiber was very flexible and could be bent and twisted into a variety of shapes and forms suitable for displays. The fiber was stored for 15 months without any noticeable change in luminescence. By way of contrast, the pure Eu(furylpentafluoropentadionate)$_3$ - (trioctylphosphine oxide)$_2$ became black and heterogeneous after standing for 2 months.

Example 24

The procedure of Example 1 was repeated replacing the thenoyltrifluoroacetone with a stoichiometrical equivalent of 1-furyl-4,4,5,5,5-pentafluoro-1,3-pentadione. The resulting tris chelate was dissolved in benzene containing trioctylphosphine oxide in a molar ratio of 5:1 with respect to the chelate, and combined with a benzene solution of polymethyl methacrylate, as described in Example 21. Benzene was then removed by freeze drying and the solid residue ground up into a powder with an average particle size of 50μ. The powder was then suspended in an aqueous medium and stored for three months and then observed under ultraviolet light illumination. The typical bright orange-red luminescence of the europium chelate was observed, and there did not appear to be any loss in luminescence. This illustrates one of the advantages of the present invention, which has been described generally above, namely that the chelate is protected against degradation by exposure to water. The test was a very drastic one, both by reason of the long time and high water concentration and the fact that the plastic had been ground into such small particle size that the exposed surface was extremely high. All of these conditions could be expected to increase the degradation effect of water.

Example 25

A solution was prepared by dissolving 5 parts of trioctylphosphine oxide and 2 parts of ytterbium (8-hydroxyquinolinate)$_3$ in 2500 parts of benzene. Two volumes of this solution were added to one volume of a 10% by weight solution of polymethylmethacrylate in benzene. The benzene was allowed to evaporate from the resultant solution, forming a yellowish transparent film. When illuminated by ultraviolet radiation, the polymeric film emitted radiation in the near infrared at 0.97μ.

Example 26

The general procedure of Example 2 was repeated replacing the dysprosium chloride with europium chloride. A solution was prepared by combining 2 parts of europium tris trifluoroacetylacetonate and 5 parts of trioctylphosphine oxide with 50 parts of dioxane. Three parts by volume of this solution were combined with two parts by volume of a dioxane solution of a polycarbonate sold by the General Electric Company under their trade name Lexan, the composition of the polycarbonate solution being 8 parts of polycarbonate per 100 parts of dioxane. The dioxane then was allowed to evaporate from this mixture, producing a film which exhibited the characteristic bright orange-red luminescence when examined under ultraviolet illumination.

Example 27

A solution composed of 17 parts of trioctylphosphine oxide, 12 parts of europium tris trifluoroacetylacetonate and 2 parts of benzoylperoxide dissolved in 80 parts of styrene was mixed with 90 parts of styrene, and the mixture was heated to 55° C. After being held at 55° C. for 16 hours, the temperature was raised to 70° C. for 1 hour, and finally was raised to 100° C. for 1 hour. The resulting solid polymer was cooled to room temperature and illuminated with ultraviolet light from a mercury arc. It exhibited intense orange-red luminescence, and the spectrum was that associated with the synergic agent complex of europium tris trifluoroacetylacetonate.

Example 28

A solution composed of 23 parts of trioctylphosphine oxide, 6 parts of europium tris trifluoroacetylacetonate, and 0.5 part of azobisisobutyronitrile dissolved in 20 parts of styrene was mixed with 51 parts of triethyleneglycol fumarate, and the resulting mixture was heated to 55° C. After being kept at this temperature for 16 hours, the temperature was raised to 70° C. for 1 hour, and finally was raised to 100° C. for 1 hour. After cooling to room temperature the resulting thermosetting solid polymer exhibited strong orange-red luminescence when irradiated with ultraviolet light from a mercury arc. The luminescence spectrum was the same as that observed in Example 27.

Example 29

A solution was prepared by dissolving 9 parts of trioctylphosphine oxide, 8 parts of hexamethylenetetramine, 9 parts of dicyandiamide, and 7 parts of europium tris trifluoroacetylacetonate in 80 parts of an epoxy resin sold by the Shell Chemical Company under their trade name Epon 828. This solution was heated to 100° C. and held at this temperature for 72 hours. After cooling to 25° C. this polymer was exposed to ultraviolet radiation and showed strong orange-red emission.

Example 30

A solution consisting of 272 parts of an acrylonitrile polymer and 1600 parts dimethyl formamide was added to a solution consisting of 11 parts trioctylphosphine oxide, 6 parts terbium tris trifluoroacetylacetonate, and 400 parts dimethyl formamide. Films cast from the resulting solution were air dried at 50° C. for three hours, followed by vacuum drying for 16 hours at 65° C. The film was slightly hazy, and when illuminated with ultraviolet radiation luminesced with a characteristic green color.

Example 31

A solution was prepared by dissolving 103 parts of trioctylphosphine oxide and 65 parts of terbium tris trifluoroacetylacetonate in 50,000 parts of benzene. This solution was combined with an equal volume of an 8% solution of polymethyl methacrylate in benzene. The luminescence spectrum obtained for this resultant solution was the same as that found for a benzene solution of the synergic agent complex of terbium tris trifluoroacetylacetonate. The lifetime of luminescence at 0.54μ excited by a short flash of ultraviolet radiation for the mixture in benzene was found to be about 35 microseconds. Then the mixture was placed on a quartz plate and allowed to evaporate, forming a clear film. This film exhibited strong green luminescence when excited by ultraviolet radiation and the luminescence spectrum was the same as for the solution. The measured lifetime of luminescence at 0.54μ for the film, however, when excited by a short flash of ultraviolet radiation of a few microseconds was in the range of 150–225 microseconds. This increase in luminescence lifetime, or luminescence relaxation time, when the luminescence spectrum remained the same, indicated a significant improvement in quantum efficiency for the solid film as compared to the liquid solution.

Example 32

A solution was prepared by dissolving 13 parts of terbium (trifluoroacetylacetonate)$_3 \cdot$H$_2$O, 2.5 parts of europium (trifluoroacetylacetonate)$_3 \cdot$H$_2$O, 25 parts (an excess) of trioctylphosphine oxide, and 24 parts of polymethylmethacrylate in 12,000 parts by volume of benzene. The luminescence of this solution was measured at 25° C. when excited by a mercury arc, and the ratio of the intensity at the wavelength corresponding to emission from the europium complex (0.61μ) to the intensity at the wavelength corresponding to emission from the terbium complex (0.54μ) was 5:3. The benzene was then evaporated, leaving a clear plastic film. The luminescence of this film was obtained under the same conditions as for the benzene solution. For the film, however, the ratio of the intensity at 0.61μ to the intensity at 0.54μ was 1:4. Since the quantum efficiency for luminescence by the europium complex does not change significantly in going from a benzene solution to a polymethylmethacrylate solid solution, the change in the intensity ratio shows that the quantum efficiency for the terbium complex luminescence increased considerably with formation of the plastic film.

Example 33

The procedure in Example 32 was repeated, except that the 24 parts of polymethylmethacrylate were replaced by 700 parts of the polymer, with essentially the same resultant behavior of luminescence intensities as described in Example 32.

Example 34

3.4 parts of europium (hexafluoroacetylacetonate)$_3$ (trioctylphosphine oxide)$_2$, 13 parts of terbium (trifluoroacetylacetonate)$_3 \cdot$H$_2$O, 28 parts of trioctylphosphine oxide, and 1000 parts of polymethylmethacrylate were dissolved in 14,000 parts by volume of benzene. This solution was divided into two equal portions, and 3.4 parts of lanthanum (hexafluoroacetylacetonate)$_3$(trioctylphosphine oxide)$_2$ were added to one portion, while 3.4 parts of neodymium (hexafluoroacetylacetonate)$_3$(trioctylphosphine oxide)$_2$ were added to the other portion. The luminescence intensity at 0.61μ (europium complex) was the same for the two portions. Similarly the luminescence intensity at 0.54μ terbium complex) was the same for the two portions. The intensity at 0.54μ, however, was less than the intensity at 0.61μ. The benzene was then evaporated from the two solutions, leaving clear plastic films. The ratio of the luminescence intensity at 0.54μ to that at 0.61μ was the same for the two films, but now the ratio was much greater than one, in direct contrast to the ratio for the benzene solutions. Furthermore, the fact that the ratio was the same for the two films showed that the neodymium ion did not exhibit any quenching action such as that known for crystalline solids.

Example 35

A solution was prepared by dissolving 12 parts of europium tris furylpentafluoropentadionate and 20 parts of orthophenanthroline (an excess) in 25,000 parts of benzene. This solution was mixed with an equal volume of benzene containing 6% by weight polystyrene. Thereafter the benzene was allowed to evaporate, leaving a transparent film containing the europium complex evenly distributed throughout. Upon being exposed to ultraviolet radiation the polymer glowed with an intense orange-red color.

Example 36

A solution was prepared by dissolving 6 parts of terbium nitrate hexahydrate in 2500 parts of acetonitrile. To this solution 5 parts of ortho phenanthroline monohydrate were added, and the mixture was warmed to 45° C. for fifteen minutes. A white precipitate formed which exhibited intense green luminescence when excited by ultraviolet radiation, and which appeared to hove some solubility in the solvent since the liquid also was luminescent. The liquid phase was combined with an equal volume of a solution consisting of 34 parts of polymethylmethacrylate dissolved in 400 parts of acetonitrile. The acetonitrile was evaporated from this mixture, leaving a clear, transparent film which exhibited green luminescence when excited by ultraviolet radiation.

Example 37

A solution is prepared by dissolving 100 parts trioctylphosphine oxide, 10 parts europium tris trifluoroacetylacetonate, 13 parts terbium tris trifluoroacetylacetonate, and 30 parts samarium tris trifluoroacetylacetonate in 35,000 parts benzene. This solution is mixed with an equal volume of a benzene solution containing 5% by weight polymethylmethacrylate. A film is cast from the resulting mixture by allowing the benzene to evaporate. When this film is illuminated with ultraviolet radiation it exhibits intense luminescence, and spectral examination of the emitted light shows the bands characteristic of the terbium, europium, and samarium synergic agent complexes.

Example 38

A mixture consisting of 18 parts europium tris trifluoroacetylacetonate, 36 parts terbium tris trifluoroacetylacetonate, 70 parts trioctylphosphine oxide, and 1500 parts of paraffin wax was heated slowly to 100° C. A clear, homogeneous solution resulted. Upon cooling to room temperature a whitish solid was obtained, representing a low molecular weight hydrocarbon polymer with trioctylphosphine oxide complexes of europium and terbium tris chelates dispersed throughout it. Paraffin wax can be considered as a very low molecular weight polyethylene. Some of the solid was used as a crayon to make a mark on a piece of paper, and when the mark was irradiated with ultraviolet light from a mercury arc, it glowed with an orange color. Spectral examination of this luminescence revealed the characteristic emission bands of europium and terbium at $0.61\mu$ and $0.54\mu$, respectively.

I claim:

1. A composition consisting essentially of an organic polymeric matrix, said matrix being a solid at room temperature and having finely dispersed therein at least one complex of at least one chelate of a lanthanide ion of atomic number greater than 57, the chelates having organic ligands capable, under ultraviolet illumination, of exciting the lanthanide ions into a metastable electronic state from which the lanthanide ion chelates emit photons having an energy corresponding to a transition of the chelated ion to a lower electronic level, the chelates being complexed with a synergic agent having the property of protecting the chelate molecules from interactions causing radiationless loss of energy subsequent to excitation by radiation in the short wave region of the electromagnetic spectrum, the synergic agent being selected from the group consisting of trialkyl group VA oxides, aryl group VA oxides, alkyl dialkyl phosphinates, dialkyl alkyl phosphonates, trialkyl phosphates, hexa-alkyl phosphoramide, and the corresponding thio analogs, dialkyl sulfoxides, dialkyl sulfones, and cyclic sulfoxides and sulfones with ring sizes from 3 to 10 carbon atoms, the amount of the chelates being sufficient to render said composition photoluminescent under ultraviolet illumination, and the synergic agent being present in an amount of at least about 1 mole per mole of chelate.

2. A composition according to claim 1 in which the lanthanide ion is selected from the group consisting of europium, terbium, dysprosium, samarium, ytterbium, thulium, neodymium, praseodymium, and erbium.

3. A composition according to claim 2 consisting essentially of a solid organic polymeric matrix, said matrix being a solid at room temperature and having finely dispersed therein at least one tetrakis chelate of a lanthanide ion having an atomic number greater than 57 having the formula $CML_4$ in which C is a cation, M is a lanthanide ion, and L is an organic ligand having a single negative charge, the ligand being capable, under ultraviolet illumination, of exciting the lanthanide ion into a metastable electronic state from which the lanthanide ion chelate emits photons having an energy corresponding to a transition of the chelated ion to a lower electronic level, the amount of said chelate being sufficient to render said composition photoluminescent under ultraviolet illumination.

4. A composition according to claim 2 consisting essentially of a solid organic polymeric matrix, said matrix being a solid at room temperature and having finely dispersed therein at least one lanthanide ion chelate of the formula $ML°_n X_3$ where M is a lanthanide ion, X is an anion, $L°$ is an electrically neutral chelating ligand, and $n$ is an integer $>0<3$, the ligands being capable, under ultraviolet illumination, of exciting the lanthanide ion into a metastable electronic state from which the lanthanide ion chelate emits photons having an energy corresponding to a transition of the chelated ion to a lower electronic level, the amount of said chelate being sufficient to render said composition photoluminescent under ultraviolet illumination.

5. A composition according to claim 2 in which the lanthanide ion chelate is selected from the group having the following formulae:

I. A tris chelate of

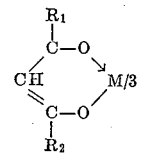

wherein $R_1$ and $R_2$ are each selected from the group consisting of alkyl containing about 1–18 carbon atoms, halogen (F, Cl) containing alkyl of 1–18 carbon atoms, alkoxy of up to 18 carbon atoms, furyl, substituted furyl, aryl, and lower alkyl substituted aryl and M is the lanthanide, and

II.

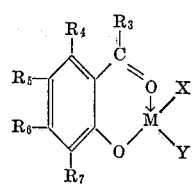

wherein X and Y are each selected from the 2-hydroxy aromatic ketone ligand of Formula II, an oxygen atom bridging two M groups and a hydroxyl, $R_3$ is selected from an alkyl group of 1–18 carbon atoms, and a halogen (F, Cl) containing alkyl group of 1–18 carbon atoms, hydrogen, alkoxy of up to 18 carbon atoms, aryloxy groups, $R_4$–$R_7$ inclusive are selected from hydrogen, alkyl containing 1–18 carbon atoms, halogen (F, Cl) containing alkyl of 1–18 carbon atoms, M is the lanthanide, and tris chelates of the lanthanide ion with organic ligands included in the group consisting of 8-hydroxy quinoline, tropolone, and chelates of lanthanide ions and phenanthroline and polypyridyls.

6. A composition according to claim 5 in which the polymeric matrix is a thermoplastic resin.

7. A composition according to claim 6 in which the resin is a polymethylmethacrylate.

8. A composition according to claim 5 in which there is a mixture of chelates of the different lanthanide ions.

9. A composition according to claim 8 in which the mixture of lanthanide ions is a mixture of ions of europium, samarium and terbium.

10. A composition according to claim 5 in which the synergic agent is trialkyl phosphine oxide.

11. A composition according to claim 5 in which the lanthanide ion is a europium ion.

12. A composition which consisting essentially of a complex of a lanthanide ion selected from the group consisting of europium, terbium, dysprosium, and samarium, with an organic chelating ligand capable, under ultraviolet illumination, of exciting the lanthanide ion into a metastable electronic state from which the lanthanide ion chelate emits photons having an energy corresponding to a transition of the chelated ion to a lower electronic level and a synergic agent having the property of protecting the chelate molecules from interactions causing radiationless loss of energy subsequent to excitation by radiation in the ultraviolet regions of the electromagnetic spectrum, the synergic agent being selected from the group consisting of trialkyl group VA oxides, aryl group VA oxides, alkyl dialkyl phosphinates, dialkyl phosphonates, trialkyl phosphates, hexa-alkyl phosphoramide, and corresponding thio analogs, dialkyl sulfoxides, dialkyl sulfones, and cyclic sulfoxides and sulfones with ring sizes from 3 to 10 atoms.

13. A composition which consisting essentially of a complex of a synergic agent selected from the group consisting of trialkyl group VA oxide, alkyl dialkyl phosphinates, dialkyl alkyl phosphonates, trialkyl phosphates, hexa-alkyl phosphoramide, their corresponding thio analogs dialkyl sulfoxides, dialkyl cyclic sulfoxides and cyclic sulfones with ring sizes from 3 to 10 atoms, and of a lanthanide ion chelate selected from the group consisting of the following formulae:

I. A tris chelate of

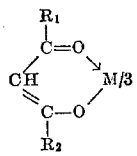

wherein X and Y are each selected from the 2-hydroxy 1–18 carbon atoms, halogen (F, Cl) containing alkyl of 1–18 carbon atoms, alkoxy of up to 18 carbon atoms, furyl, thienyl, lower alkyl substituted furyl, aryl and alkaryl neither having more than 2 rings and M is europium, terbium, dysprosium and samarium.

II.

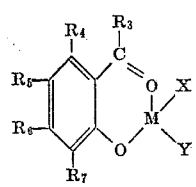

wherein X and Y are each selected from the 2-hydroxy aromatic ketone ligand of Formula II, an oxygen atom bridging two M groups and a hydroxyl, $R_3$ is selected from an alkyl group of 1–18 carbon atoms, and a halogen (F, Cl) containing alkyl group of 1–18 carbon atoms, $R_4$–$R_7$ inclusive are selected from hydrogen, alkyl containing 1–18 carbon atoms, halogen (F, Cl) containing alkyl of 1–18 carbon atoms and M is a lanthanide ion having an atomic weight greater than 57, and the amount of the synergic agent being at least about 1 mole per mole of chelate.

14. A composition according to claim 13 in which M is europium.

15. The composition of claim 14 wherein the synergic agent is trialkyl phosphine oxide and the $R_1$ and $R_2$ of the tris chelate are each fluorine containing alkyl groups of 1–18 carbon atoms.

16. The composition of claim 14 wherein the synergic agent is trialkyl phosphate and in the tris chelate $R_1$ is fluorine containing alkyl of 1–18 carbon atoms and $R_2$ is an alkyl of 1–18 carbon atoms.

17. The composition of claim 14 wherein the synergic agent is a trialkyl phosphine oxide and the $R_1$ and $R_2$ of the tris chelate are each phenyl groups.

18. The composition of claim 14 wherein the synergic agent is a trialkyl phosphine oxide and in the tris chelate $R_1$ is a fluorine containing alkyl of 1–18 carbon atoms and $R_2$ is a thienyl group.

19. A composition which consisting essentially of a complex of a dialkyl sulfoxide, the alkyls having up to 18 carbon atoms and a chelate of a lanthanide ion having an atomic number greater than 57 selected from the group having the following formulae:

I. A tris chelate of

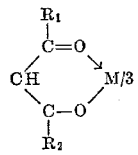

wherein $R_1$ and $R_2$ are each selected from the group consisting of alkyl containing about 1–18 carbon atoms, halogen (F, Cl) containing alkyl of 1–18 carbon atoms, alkoxy of up to 18 carbon atoms, furyl, lower alkyl substituted furyl and aryl, thienyl, lower alkyl substituted aryl, and M is the lanthanide ion, and

II.

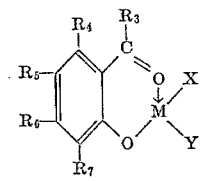

wherein X and Y are each selected from the 2-hydroxy aromatic ketone ligand of Formula II, an oxygen atom bridging two M groups and a hydroxyl, $R_3$ is selected from an alkyl group of 1–18 carbon atoms, and a halogen (F, Cl) containing alkyl group of 1–18 carbon atoms, $R_4$–$R_7$ inclusive are selected from hydrogen, alkyl containing 1–18 carbon atoms, halogen (F, Cl) containing alkyl of 1–18 carbon atoms and M is a lanthanide ion, the amount of synergic agent being at least equal to about 1 mole per mole of chelate.

20. A composition which consisting essentially of a complex of a hexa-lower alkyl phosphoramide and of a chelate of a lanthanide ion having an atomic number greater than 57 selected from the group consisting of the following formulae:

I. A tris chelate of

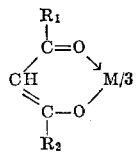

wherein $R_1$ and $R_2$ are selected from alkyl containing 1–18 carbon atoms, halogen (F, Cl) containing alkyl of 1–18 carbon atoms, alkoxy up to 18 carbon atoms, furyl, thienyl, alkyl substituted furyl, aryl and lower alkaryl and M is the lanthanide ion.

II.

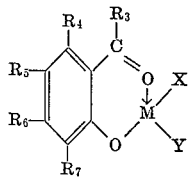

wherein X and Y are each selected from the 2-hydroxy aromatic ketone ligand of Formula II, an oxygen atom bridging two M groups and a hydroxyl, $R_3$ is selected from an alkyl group of 1–18 carbon atoms, and a halogen (F, Cl) containing alkyl group of 1–18 carbon atoms, $R_4$–$R_7$ inclusive are selected from hydrogen, alkyl containing 1–18 carbon atoms, halogen (F, Cl) containing alkyl of 1–18 carbon atoms and M is a lanthanide ion, the hexa-alkyl phosphoramide being present in an amount at least about 1 mole per mole of chelate.

21. A composition which consisting essentially of a complex of a lanthanide ion having an atomic number greater than 57 with 8-hydroxy quinoline to form a chelate, the chelate being complexed with a synergic agent having the property of protecting the chelate molecules from interactions causing radiationless loss of energy subsequent to excitation by radiation in the ultraviolet, selected from the group consisting of trialkyl group VA oxides, aryl group VA oxides, alkyl dialkyl phosphinates, dialkyl alkyl phosphonates, trialkyl phosphates, hex-alkyl phosphoramide, their corresponding thio analogs, dialkyl sulfoxides, dialkyl sulfones, cyclic sulfoxides and cyclic sulfones with ring sizes from 3 to 10 atoms the amount of synergic agent being at least about 1 mole per mole of chelate.

References Cited

Filipescu et al.—"Fluorescent Properties of Rare Earth Chelates in Vinylic Hosts"—Nature vol. 196, No. 4853, Nov. 3, 1962, pp. 467–468.

Whan et al.—"Luminescence Studies of Rare Earth Complexes: Benzoylacetonate and Dibenzoylmethide Chelates"—Journal of Molecular Spectroscopy—8, 315–327 (1962).

Wolff et al.—"Optical Maser Action in an $Eu^3$-Containing Organic Matrix"—Applied Physics Letters vol. 2, No. 8, Apr. 15, 1963, pp. 152–154.

Tomaino—"Chelate Lasers Are Coming"—Electronics Apr. 26, 1963, pp. 32–33.

TOBIAS E. LEVOW, *Primary Examiner.*

ROBERT D. EDMONDS, *Examiner.*

UNITED STATES PATENT OFFICE
CERTIFICATE OF CORRECTION

Patent No. 3,377,292    April 9, 1968

Frederick Halverson

It is certified that error appears in the above identified patent and that said Letters Patent are hereby corrected as shown below:

Column 1, line 50, "M1$'_2$X" should read -- ML$'_2$X --. Column 2, lines 47 to 53, the formula should appear as shown below:

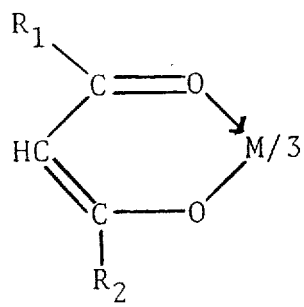

Column 3, line 15, "formula II of" should read -- formula II, or --; line 24, "celates" should read -- chelates --. Column 5, line 1, after "proceeding" cancel the period and insert a comma. Columns 7 and 8, TABLE I, third column, line 13 thereof, "TOPO$^e$" should read -- TOPO$^c$ --. Column 11, line 47, "buffeted" should read -- buffered --. Column 18, lines 43 to 49, the formula should appear as shown below:

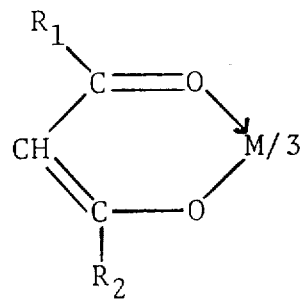

Column 19, line 31, "dialkyl phosphonates" should read -- dialkyl alkyl phosphonates --; line 40, "analogs dialkyl sulfoxides, dialkyl cyclic sulfoxides" should read -- analogs, dialkyl sulfoxides, dialkyl sulfones, cyclic sulfoxides --; line 52, "wherein X and Y are each selected from the 2-hydroxy" should read -- wherein $R_1$ and $R_2$ are selected from alkyl containing --; line 57, "samarium." should read -- samarium, and --; line 75, "weight" should read -- number --. Column 20, lines 26 to 32, the formula should appear as shown below:

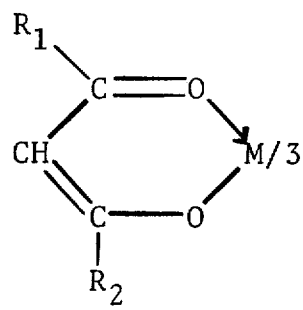

line 56, "a lanthanide" should read -- the lanthanide --.
Column 21, line 1, before "alkyl" insert -- lower --; line 2, "lanthanide ion." should read -- lanthanide ion, and --; line 19, "a lanthanide" should read -- the lanthanide --.

Signed and sealed this 16th day of December 1969.

(SEAL)
Attest:

EDWARD M.FLETCHER,JR.
Attesting Officer

WILLIAM E. SCHUYLER, JR.
Commissioner of Patents